United States Patent [19]

Hostetler

[11] Patent Number: 5,445,113
[45] Date of Patent: Aug. 29, 1995

[54] RESTRAINT ATTACHMENT FOR AN ANIMAL

[76] Inventor: Kami Hostetler, 105 Forrest Dr., Mt. Holly, N.C. 28120

[21] Appl. No.: 295,517

[22] Filed: Aug. 24, 1994

[51] Int. Cl.⁶ ............................................. A01K 29/00
[52] U.S. Cl. .................................................... 119/795
[58] Field of Search ................... 119/769, 792–807

[56] References Cited

U.S. PATENT DOCUMENTS

| | | | |
|---|---|---|---|
| 2,929,358 | 3/1960 | Morrow | 119/797 |
| 3,244,149 | 4/1966 | Bosko et al. | 119/795 |
| 4,522,153 | 6/1985 | Vander Horst | 119/799 |
| 4,681,303 | 7/1987 | Grassaro | 119/769 |
| 4,998,507 | 3/1991 | Browning | 119/799 |

FOREIGN PATENT DOCUMENTS 768436 8/1934 France ................................ 119/793

Primary Examiner—Gene Mancene
Assistant Examiner—Thomas Price
Attorney, Agent, or Firm—W. Thad Adams, III

[57] ABSTRACT

A restraint attachment for a collar or harness of an animal is provided for use in confining the animal to a predetermined area. The restraint attachment includes a threaded cap for being removably secured to a connecting object located in the predetermined area. The connecting object includes complementary threads for being mated with the threads of the cap to thereby attach the connecting object and the cap together. A clip is associated with the cap for releasably attaching the cap to the collar or harness of the animal.

8 Claims, 4 Drawing Sheets

RESTRAINT ATTACHMENT FOR AN ANIMAL

TECHNICAL FIELD AND BACKGROUND OF THE INVENTION

This invention relates to a restraint attachment for an animal, such as a dog. The invention is easily and conveniently attached at one end to the dog's collar, harness or other restraining device, and at the opposite end to an outdoor water spigot or garden hose. The invention is used to confine the dog to a predetermined area, such as the front or back yard of a house.

Typical devices of the prior art suffer from drawbacks and limitations. For example, in the absence of a fence, dogs kept in the yard are generally restrained and confined by a leash of considerable length. The leash is usually permanently attached at one end to the ground, a tree, or a dog house, and at the opposite end to the dog's collar. In the course of running about and playing in the yard, the leash frequently becomes tangled or tightly wrapped around adjacent trees and other structures located in the yard. This limits the dog's movement, and may ultimately lead to injury if the dog is left unattended. Moreover, if not properly and adequately secured, the leash will detach from the ground or tree over a relatively short period of time. Thus, frequent inspection of the attachment point is generally required.

The present invention addresses these and other problems of the prior art by providing a restraint attachment which is easily and securely attached to a preexisting object commonly located at or near the house, such as a garden hose or water spigot. In the case of a garden hose, for example, the invention connects the free end of the hose to the collar of the dog. The hose resists tangling, and provides a relatively long leash which will not be easily broken, or detached from the spigot. Moreover, since many dogs resist being bathed and often run away from the owner at and during bath time, the present invention provides convenient means of restraining the dog as the owner washes the dog with the hose.

SUMMARY OF THE INVENTION

Therefore, it is an object of the invention to provide a restraint attachment for a dog which is easily and securely connected to the free end of a garden hose or water spigot.

It is another object of the invention to provide a restraint attachment which allows the owner to easily restrain the dog during washing.

It is another object of the invention to provide a restraint attachment which is relatively inexpensive.

It is another object of the invention to provide a restraint attachment which is relatively easy to manufacture.

It is another object of the invention to provide a restraint attachment which conveniently attaches to a garden hose, and thus provides a leash which resists tangling.

It is another object of the invention to provide a leash which will not be easily broken or detached from the attachment point.

These and other objects of the present invention are achieved in the preferred embodiments disclosed below by providing a restraint attachment for use in confining an animal to a predetermined area. The restraint attachment includes a threaded cap for being removably secured to a connecting object located in the predetermined area. The connecting object includes a plurality of complementary screw threads for being mated with the screw threads of the cap to thereby attach the connecting object and the cap together. Attachment means are associated with the cap for releasably attaching the cap to a collar or harness placed on the animal.

According to one preferred embodiment of the invention, leash means interconnects the cap and the attachment means. The leash means provides a line of indeterminate length for restraining the animal and for confining the animal to the area surrounding the connecting object.

According to another preferred embodiment of the invention, the connecting object is a water spigot secured to an immovable structure.

According to yet another preferred embodiment of the invention, the connecting object is a hose attached to a water spigot.

According to yet another preferred embodiment of the invention, the cap includes a plurality of top wall openings therein for allowing water to pass from the spigot through the hose to the animal.

According to yet another preferred embodiment of the invention, the cap includes an annular washer located on an inside wall thereof for sealing the connection between the cap and the hose.

According to yet another preferred embodiment of the invention, the attachment means is a spring-loaded thumb clip for being attached to the collar or harness of the animal.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
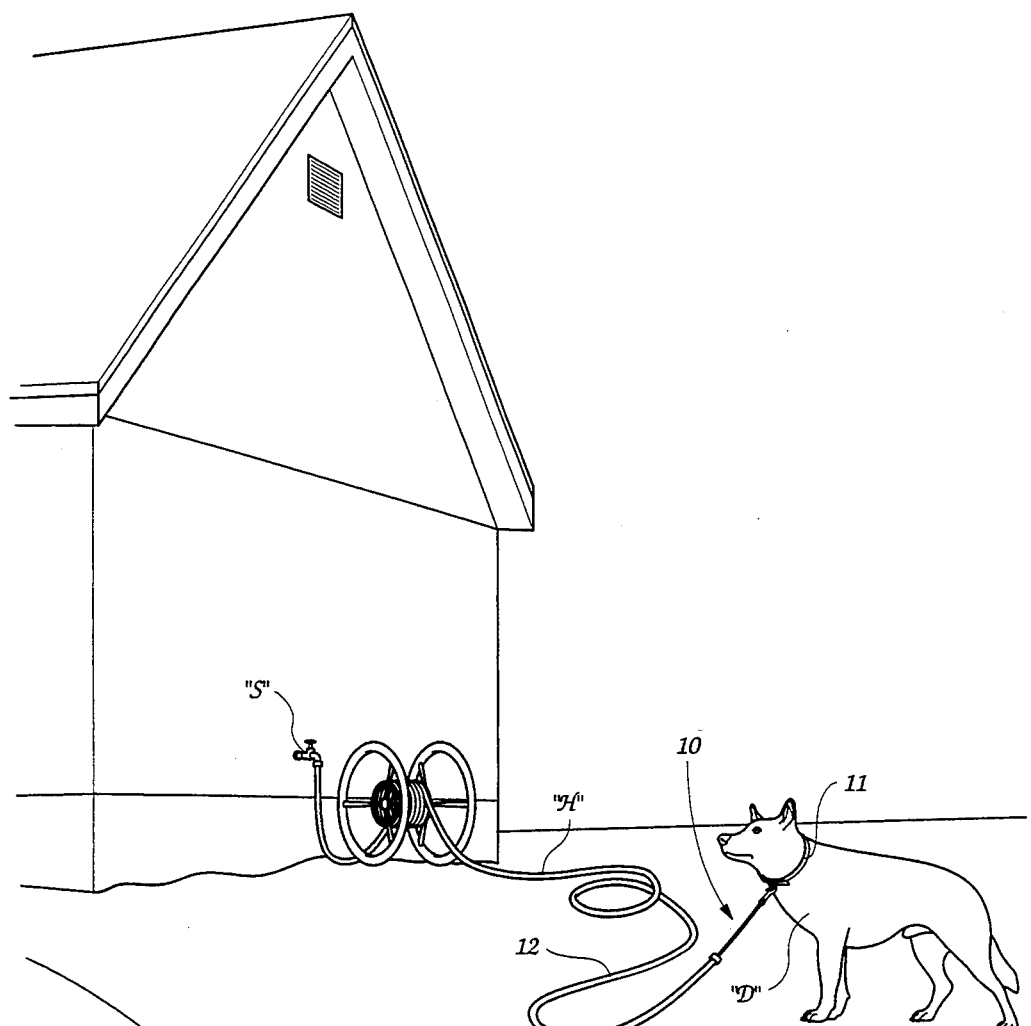
FIG. 1 is an environmental view illustrating one preferred application of the invention, and showing the invention secured at one end thereof to the collar of a dog and at the opposite end thereof to a garden hose, the hose being attached to an outdoor spigot.

Referring now specifically to the drawings, a restraint attachment for a collar or harness of an animal according to the present invention is illustrated in FIG. 1 and shown generally at reference numeral 10. The restraint attachment 10 is preferably secured at one end of the attachment 10 to a collar 11 of an animal, such as a dog "D", and secured at the opposite end of the attachment 10 to a connecting object 12. As shown in FIG. 1, the connecting object 12 may be a conventional garden hose "H" attached to a water spigot "S" typically located on or near a house. Alternatively, the restraint attachment 10 may be secured directly to the spigot "S".

Figure 2:
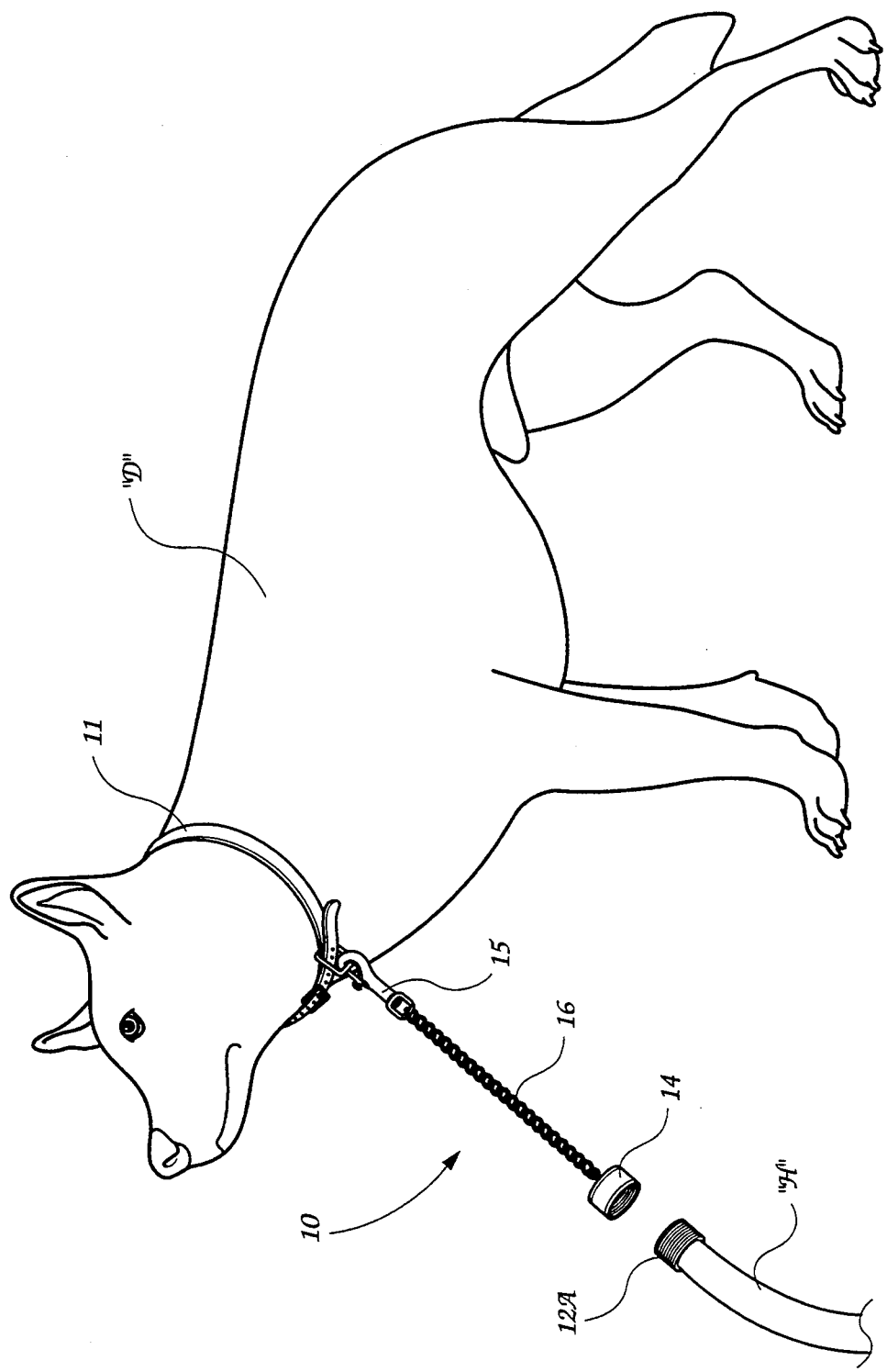
FIG. 2 is an enlarged view of the invention illustrated in FIG. 1, showing the restraint attachment secured at one end thereof to the collar of a dog and at the opposite end thereof to the hose.

As is commonly known in the art, both the garden hose "H" and spigot "S" include a connecting outlet having external screw threads for permitting convenient attachment of lawn care devices such as sprinkler hoses, oscillating sprinklers, pistol nozzles, and the like. The threaded outlet 12A of the hose "H" is shown in FIG. 2. The size and diameter of the threaded outlet 12A is generally standard in the art.

Figure 3:
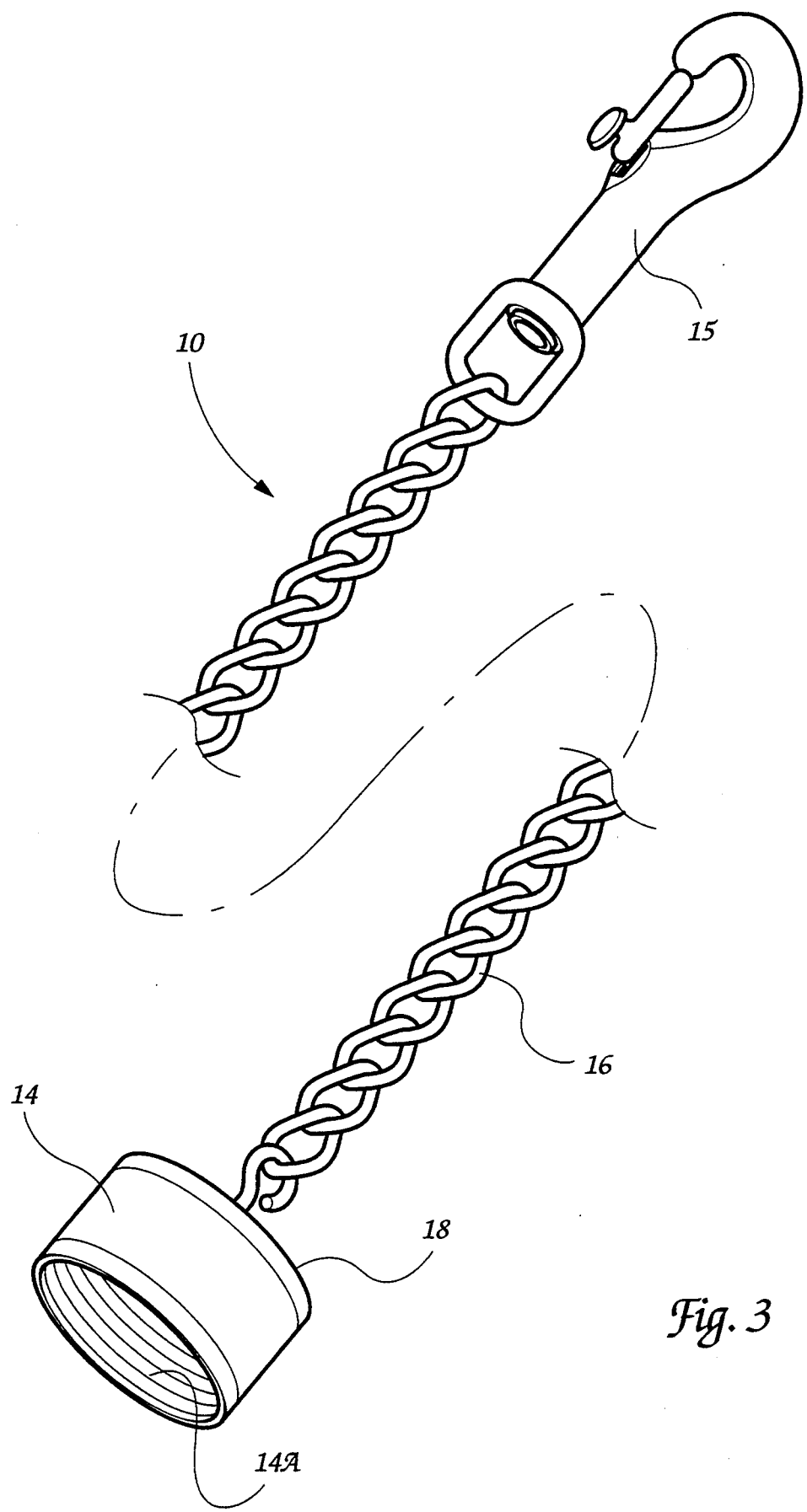
FIG. 3 is a perspective view of the restraint attachment according to a preferred embodiment of the invention.

As best shown in FIGS. 2 and 3, the restraint attachment 10 includes a cap 14 with internal screw threads 14A. The cap 14 is thus removably connected to the connecting outlet 12A of the hose "H" by mating the complementary screw threads of the cap 14 and hose "H". A conventional, spring-loaded thumb clip 15 is located at the opposite end of the attachment 10 for securing the attachment 10 to the collar 11 of the dog "D". The thumb clip 15 allows the attachment 10 to be easily attached and detached from the collar 11. In an alternative application, the threaded cap 14 may be attached in an identical manner to the connecting outlet of the spigot "S".

Preferably, a chain leash 16 interconnects the cap 14 and the thumb clip 15. The leash 16 helps relieve some of the strain on the collar 11 resulting from the weight of the hose "H" and is especially desirable for use with smaller animals. The leash 16 may be of any desired length. For example, if the cap 14 is secured directly to the spigot "S" as described above, the leash 16 may be anywhere from 10-30 feet in length. Moreover, the leash 16 may be formed of any suitable material, such as steel, nylon rope, or cloth.

Figure 4:
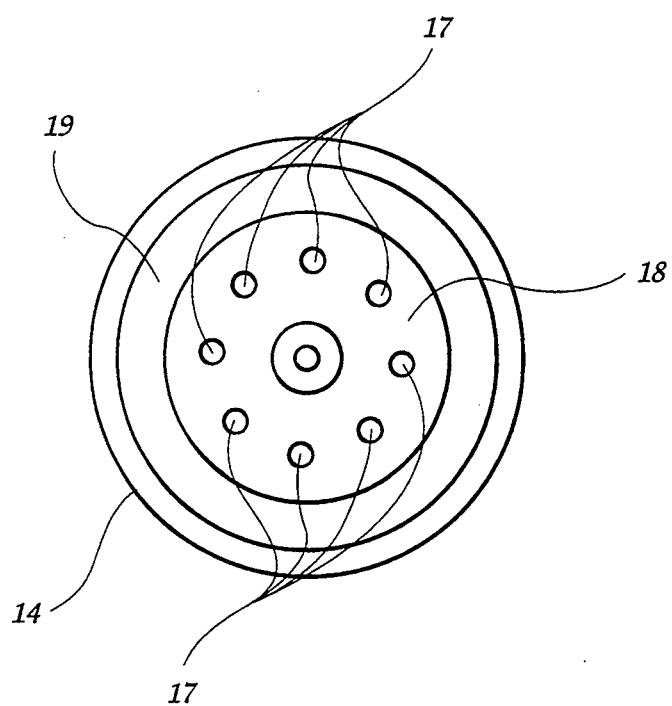
FIG. 4 is a bottom end view of the threaded cap showing the washer, and several openings formed in the top wall of the cap.

Referring to FIG. 4, the cap 14 preferably includes several openings 17 formed in a top wall 18 of the cap 14 for allowing water to pass from the spigot "S" and hose "H" through the cap 14, and to the dog "D". This allows the user to conveniently wash the dog "D" without removing the attachment 10 from the hose "H". The openings 17 further allow the dog "D" to drink directly from the hose "H" without removing the opposite end of the attachment 10 from the collar 11. In addition, a rubber washer 19 is preferably located on an inside surface of the top wall 18 of the cap 14 for sealing the connection between the cap 14 and the connecting outlet 12A of the hose "H".

The cap 14 is preferably formed of copper. Alternatively, the cap 14 may be formed of a light weight, injection-molded PVC plastic.

Figure 5:
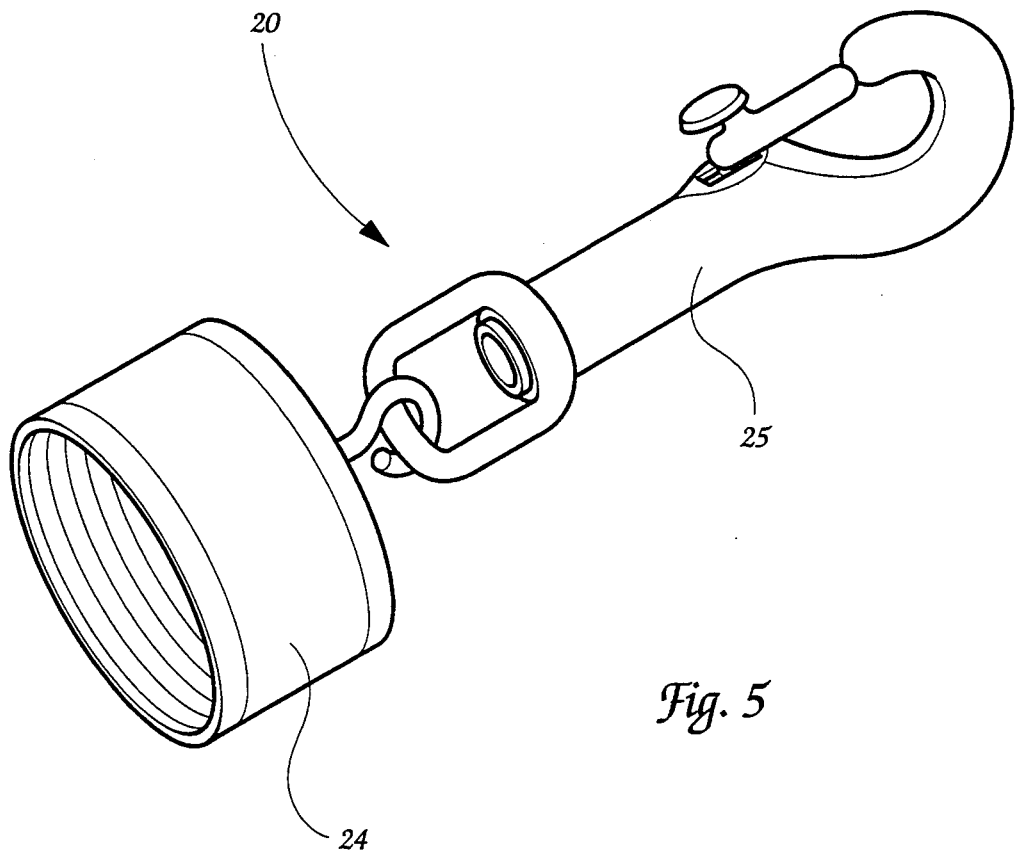
FIG. 5 is a perspective view of the restraint attachment according to a second preferred embodiment of the invention.

A second embodiment of the restraint attachment 20 is illustrated in FIG. 5. As shown, a threaded cap 24 identical to the cap 14 is connected to a spring-loaded thumb clip 25 identical to the clip 15. The cap 24 connects to the garden hose "H" and the clip 25 attaches to the collar of the dog "D", as described above.

A restraint attachment for an animal is described above. Various details of the invention may be changed without departing from its scope. Furthermore, the foregoing description of the preferred embodiment of the invention is provided for the purpose of illustration only and not for the purpose of limitation—the invention being defined by the claims.

I claim:

1. In combination with a spigot secured to an immovable structure, a restraint attachment for a collar or harness of an animal for use in confining the animal to a predetermined area, said restraint attachment comprising:
    (a) a threaded cap removably secured to a connecting end of the spigot, the connecting end including complementary threads for being mated with the threads of said cap to thereby attach the spigot and the cap together; and
    (b) attachment means associated with said cap for releasably attaching said cap to the collar or harness of the animal.

2. A combination according to claim 1, and including leash means interconnecting said cap and said attachment means, said leash means providing a line of indeterminate length for restraining the animal and confining the animal to the predetermined area.

3. A combination according to claim 1, wherein said attachment means comprises a spring-loaded thumb clip for being attached to the collar or harness of the animal.

4. In combination with a spigot secured to an immovable structure and a hose attached to the spigot, a restraint attachment for a collar or harness of an animal for use in confining the animal to a predetermined area, said restraint attachment comprising:
    (a) a threaded cap removably secured to a connecting end of the hose, the connecting end of the hose including complementary threads for being mated with the threads of said cap to thereby attach the hose and the cap together; and
    (b) attachment means associated with said cap for releasably attaching said cap to the collar or harness of the animal.

5. A combination according to claim 4, and including leash means interconnecting said cap and said attachment means, said leash means providing a line of indeterminate length for restraining the animal and confining the animal to the predetermined area.

6. A combination according to claim 4, wherein said attachment means comprises a spring-loaded thumb clip for being attached to the collar or harness of the animal.

7. A combination according to claim 4, wherein said cap includes a plurality of top wall openings therein for allowing water to pass from the spigot through the hose to the animal.

8. A combination according to claim 4, wherein said cap includes an annular washer located on an inside wall thereof for sealing the connection between the cap and the hose.

* * * * *